US011812086B2

United States Patent
Liu et al.

(10) Patent No.: US 11,812,086 B2
(45) Date of Patent: Nov. 7, 2023

(54) VIDEO DATA OBTAINING METHOD AND APPARATUS, ELECTRONIC DEVICE, AND STORAGE MEDIUM

(71) Applicants: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

(72) Inventors: Yongchao Liu, Suzhou (CN); Yi Wang, Suzhou (CN); Panpan Duan, Suzhou (CN)

(73) Assignees: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 17/789,649

(22) PCT Filed: Dec. 29, 2020

(86) PCT No.: PCT/CN2020/141096
§ 371 (c)(1),
(2) Date: Aug. 25, 2022

(87) PCT Pub. No.: WO2021/136307
PCT Pub. Date: Jul. 8, 2021

(65) Prior Publication Data
US 2023/0039406 A1    Feb. 9, 2023

(30) Foreign Application Priority Data

Dec. 31, 2019 (CN) .......................... 201911421431.4

(51) Int. Cl.
*G06F 15/16* (2006.01)
*H04N 21/2743* (2011.01)
(Continued)

(52) U.S. Cl.
CPC ..... *H04N 21/2743* (2013.01); *G06F 9/45504* (2013.01); *G06F 16/735* (2019.01); *H04N 21/25833* (2013.01)

(58) Field of Classification Search
CPC .......... H04N 21/2743; H04N 21/25833; G06F 16/735; G06F 9/45504
(Continued)

(56) References Cited

U.S. PATENT DOCUMENTS 9,916,231 B2    3/2018 Lundstrom
10,303,820 B2 *    5/2019 Yim .................... G06F 9/45558
(Continued)

FOREIGN PATENT DOCUMENTS

CN    101355777 A    1/2009
CN    102984028 A    3/2013
(Continued)

OTHER PUBLICATIONS

Mike_Shine. "Tiktok Crawler Based on Automated Test)" https://blog.csdn.net/mike_shine/article/details/81203330, Jul. 25, 2018 (Jul. 25, 2018) (Year: 2018).*
(Continued)

*Primary Examiner* — Liang Che A Wang
(74) *Attorney, Agent, or Firm* — Cooper Legal Group, LLC

(57) ABSTRACT

A video data obtaining method comprises: deploying at least two simulators, each of the at least two simulators being used to simulate operation of one mobile terminal; sending video access requests to a server respectively by means of the at least two simulators; and respectively receiving, by
(Continued)

means of the at least two simulators, video data returned by the server according to the corresponding video access requests. During the respectively receiving, by means of the at least two simulators, video data returned by the server according to the corresponding video access requests, the obtaining method further comprises: intercepting the video data returned by the server according to the corresponding video access requests, and storing the intercepted video data in a set database.

15 Claims, 7 Drawing Sheets

(51) Int. Cl.
    *G06F 16/735*     (2019.01)
    *G06F 9/455*     (2018.01)
    *H04N 21/258*     (2011.01)

(58) Field of Classification Search
    USPC ................................. 709/217, 223, 224, 226
    See application file for complete search history.

(56) References Cited

U.S. PATENT DOCUMENTS

| | | | | |
|---|---|---|---|---|
| 10,848,805 | B1* | 11/2020 | Mattar | ............. H04N 21/47202 |
| 2008/0145829 | A1* | 6/2008 | Huang | ..................... G09B 5/06 |
| | | | | 434/308 |
| 2015/0081764 | A1 | 3/2015 | Zhao | |
| 2015/0089590 | A1* | 3/2015 | Krishnan | ........... A61N 1/37254 |
| | | | | 607/59 |
| 2017/0017566 | A1 | 1/2017 | Lundstrom | |
| 2017/0221092 | A1* | 8/2017 | Toval | ................... G06Q 50/184 |

FOREIGN PATENT DOCUMENTS

| | | | | |
|---|---|---|---|---|
| CN | 103686198 | A | | 3/2014 |
| CN | 104036194 | A | | 9/2014 |
| CN | 107908952 | A | | 4/2018 |
| CN | 109033072 | A | | 12/2018 |
| CN | 109446801 | A | | 3/2019 |
| CN | 109688483 | A | | 4/2019 |
| CN | 110032472 | A | * | 7/2019 |
| CN | 110351259 | A | | 10/2019 |

OTHER PUBLICATIONS

"Tiktok Crawler (based on automated testing)", Jul. 2018, Mike Shine, Reprinted from the Internet at: https://blog.csdn.net/mike_shine/article/details/81203330, 6 pgs.

International Search Report in the international application No. PCT/CN2020/141096, dated Mar. 18, 2021, 2 pgs.

English translation of the Written Opinion of the International Search Authority in the international application No. PCT/CN2020/141096, dated Mar. 18, 2021, 4 pgs.

* cited by examiner

VIDEO DATA OBTAINING METHOD AND APPARATUS, ELECTRONIC DEVICE, AND STORAGE MEDIUM

CROSS-REFERENCE TO RELATED APPLICATIONS

This is a national phase of PCT application No. PCT/CN2020/141096 filed on Dec. 29, 2020, which claims priority to Chinese Patent Application No. 201911421431.4, filed on Dec. 31, 2019. The disclosure of these applications is hereby incorporated by reference in their entireties.

TECHNICAL FIELD

The disclosure belongs to the technical field of Internet, and more particular to a video data acquisition method and apparatus, an electronic device, and a storage medium.

BACKGROUND

Currently, many young people like uploading videos to mobile video software. Due to the large number of uploaded videos and diverse contents thereof, part of videos may bring negative effects to teenagers using the mobile video software. Therefore, it is necessary to perform network supervision on video data in the mobile video software.

However, most of mobile video software is shelled and encrypted. As a result, it is difficult to acquire video data during network supervision currently.

SUMMARY

In order to solve the related technical problems, embodiments of the disclosure provide a video data acquisition method and apparatus, an electronic device, and a storage medium.

The embodiments of the disclosure provide a video data acquisition method, which may include the following operations.

At least two simulators are deployed. Each of the at least two simulators is configured to simulate running of a mobile terminal.

Video access requests are sent to a server through the at least two simulators respectively. The server is a server corresponding to a video application.

Video data returned by the server according to the corresponding video access requests is received through the at least two simulators respectively.

When the video data returned by the server according to the corresponding video access requests is received through the at least two simulators respectively, the acquisition method may further include the following operation.

The video data returned by the server according to the corresponding video access requests is intercepted, and the intercepted video data is stored in a set database.

In the solution, the acquisition method may further include the following operations.

An amount of the video data corresponding to each of the at least two simulators in the set database is statistically obtained at a set interval.

In case that the amount satisfies a first set condition, a video application on the corresponding simulator is restarted. The first set condition represents that the amount is abnormal.

In the solution, the acquisition method may further include the following operation.

A parameter corresponding to the simulator is modified. The parameter may include at least one of a sequence number of the mobile terminal, a model number of the mobile terminal, or a Media Access Control (MAC) address.

In the solution, when the video access requests are sent to the server through the at least two simulators respectively, the method may include the following operations.

An operation script corresponding to the video application is acquired.

The operation script is executed to send a video access request to the server corresponding to the video application.

In the solution, when the video access requests are sent to the server through the at least two simulators respectively, the method may include the following operations.

A video access request containing a first set keyword is sent to the server, to enable the server to return first video data correlated with the first set keyword.

Alternatively, a video access request containing a first user name is sent to the server, to enable the server to return second video data uploaded by a user account corresponding to the first user name.

Alternatively, a video access request containing a second user name is sent to the server, to enable the server to return third video data. The third video data is video data pushed by the server to a user account corresponding to the second user name according to historical access data of the user account corresponding to the second user name.

In the solution, before the operation that the video access request containing the first user name is sent to the server, the acquisition method may further include the following operations.

User accounts corresponding to video data in the set database and uploading the video data are acquired.

A score of each user account is calculated according to a first parameter of the user account and a corresponding weight. The first parameter includes at least one of an amount of interaction information received by the user account or a number of users following the user account.

A user name corresponding to a user account having a score greater than a first set value is determined as the first user name.

In the solution, the acquisition method may further include the following operations.

A user name access request containing a second set keyword is sent to the server, to enable the server to return user names correlated with the second set keyword.

A correlation between each user name returned by the server and the second set keyword is determined.

A user name with a correlation greater than a second set value is determined as the first user name.

The embodiments of the disclosure also provide a video data acquisition apparatus, which may include a deployment module, a sending module, and a receiving module.

The deployment module may be configured to deploy at least two simulators. Each of the at least two simulators is configured to simulate running of a mobile terminal.

The sending module may be configured to send, through the at least two simulators, video access requests to a server respectively. The server is a server corresponding to a video application.

The receiving module may be configured to receive, through the at least two simulators, video data returned by the server according to the corresponding video access requests respectively.

The acquisition apparatus may further include an interception module.

The interception module may be configured to intercept the video data returned by the server according to the corresponding video access requests, and store the intercepted video data in a set database.

The embodiments of the disclosure also provide an electronic device, which may include a processor and a memory. The processor may be connected with the memory. The memory may be configured to store a computer program. The computer program may include a program instruction. The processor may be configured to call the program instruction to execute operations of the above video data acquisition method.

The embodiments of the application also provide a computer-readable storage medium, having stored a computer program thereon. The computer program, when executed by a processor, may implement the operations of the above video data acquisition method.

According to the embodiments of the disclosure, at least two simulators are deployed, and video access requests are sent to a server of a video application through the at least two simulators respectively, so that more video data may be acquired by concurrent processing of multiple simulators, and the video data acquisition efficiency is improved. In addition, when video data returned by the server according to the corresponding video access requests is received through the at least two simulators respectively, the video data returned by the server according to the corresponding video access requests is intercepted, so that the video application may be prevented from being shelled off and decrypted, and the acquired video data has a higher reference.

DETAILED DESCRIPTION

Many young people like uploading videos to mobile video software. Since many users upload videos to the mobile video software, the number of uploaded videos is large and contents of the uploaded videos is diverse, and part of videos may contain contents unsuitable for juveniles, which may bring negative effects to juveniles using the mobile video software. Therefore, it is necessary to perform network supervision on video data in the mobile video software.

Currently, there are two technical solutions in the related art to acquire video data in such mobile video software. According to the first solution, the mobile video software is cracked to acquire video data. However, the existing mobile video software may generally be encrypted and shelled. Shelling is a mobile application encryption mode. Mobile application shelling refers to embedding a segment of code into a binary application to encrypt, hide, and obfuscate an original binary text. After the application is shelled, control over the application may be obtained first during running. Mobile application shelling may protect a core code algorithm of the mobile application to improve difficulties in cracking. Shelling-off, a reverse process of shelling, refers to cracking the mobile application. Therefore, high manpower and material cost is needed for shelling-off and decryption during the acquisition of video data in mobile video software. Even if being cracked successfully, the mobile video software needs to be cracked again once an encryption parameter thereof is modified. Therefore, this technical solution is relatively high in difficulty and cost, and unsuitable for supervising video data in the mobile video software. According to the second solution, some mobile video software may provide corresponding video websites for users to download videos from the mobile video software. However, not all mobile video software provides video websites, and the video website updates video data not so timely as the mobile video software. Therefore, this technical solution is also unsuitable for supervising video data in the mobile video software.

For the shortcoming in the related art that it is difficult to acquire video data of the mobile video software, the embodiments of the disclosure provide a video data acquisition method, which can prevent the mobile video software from being shelled-off and decrypted and ensure that acquired video data has a higher reference. In order to describe the technical solutions of the disclosure, descriptions will be made below with specific embodiments.

Figure 1:
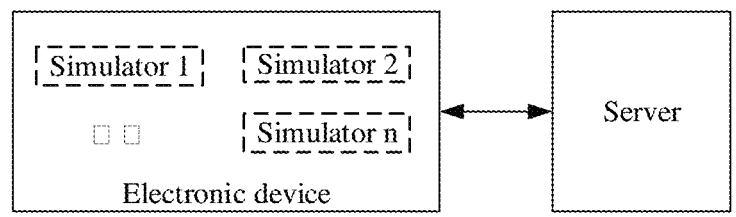
FIG. 1 is a structure diagram of a system for a video data acquisition method according to an embodiment of the disclosure.

Referring to FIG. 1, FIG. 1 is a structure diagram of a system for a video data acquisition method according to an embodiment of the disclosure. As shown in FIG. 1, the acquisition system includes an electronic device and a server.

In the embodiment of the disclosure, the server is a server of a video application. The server of the video application stores user information and video data on the video application. The server, when receiving a video access request sent by the electronic device through a simulator, returns corresponding video data to the simulator according to a specific content of the video access request. The electronic device exists mainly in form of a server or server cluster. At least two simulators are deployed on the electronic device. The electronic device is configured to send video access requests to the server through the simulators. Each simulator is configured to simulate an operating environment of a mobile terminal and run a video application on the mobile terminal.

Figure 2:
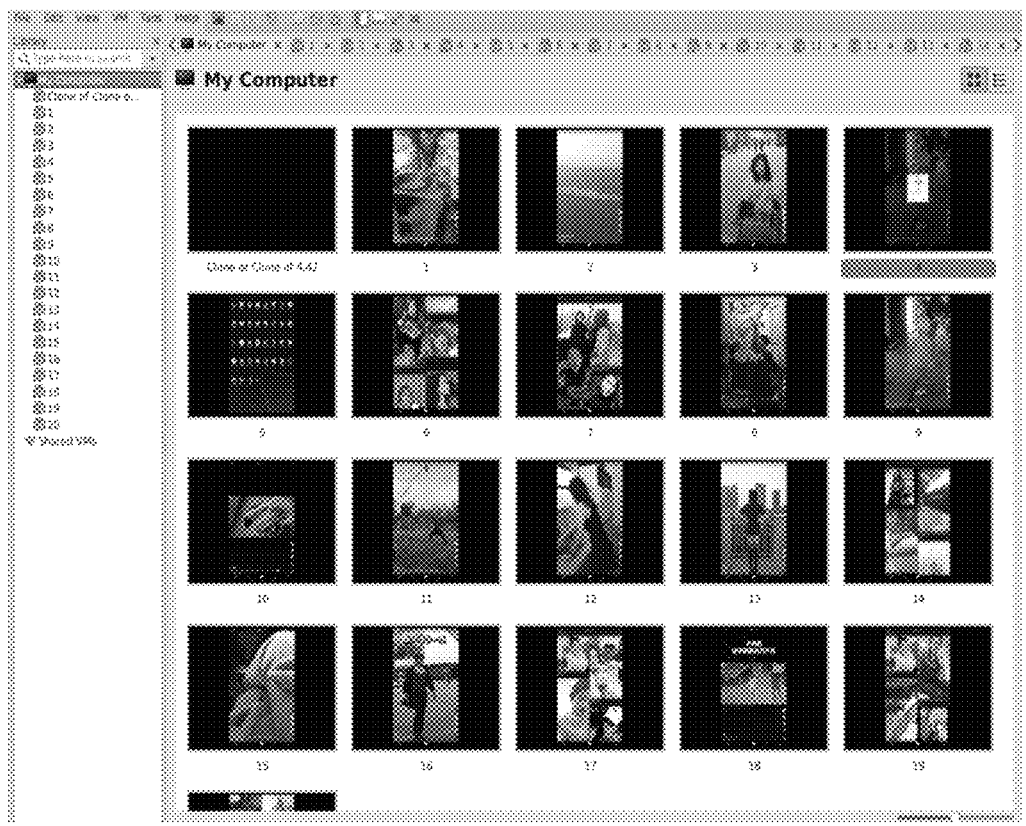
FIG. 2 is a schematic diagram of a simulator according to an embodiment of the disclosure.

Each simulator may be understood as being equivalent to a mobile terminal. In practical applications, taking simulating a mobile terminal with an Android operating system as an example, an iso image file of Android-X86 is downloaded on the electronic device first. Android-X86 is an Android operating system running on an X86 Personal Computer (PC), and an Android program may run on Android-X86. Then, an Android simulator is created in VMware, an Andoid-X86.iso image is imported to the Android simulator, and a memory and a Central Processing Unit (CPU) are allocated to the Android simulator. As such, the Android simulator is created. Finally, the Android simulator is started, and configuration of the Android simulator is completed according to the guide of an Android interface. Then, a video application may be installed and run on the Android simulator. VMware is virtual desktop computer software capable of enabling a user to simultaneously run different operating systems on a single desktop and develop, test, and deploy new applications. An Android simulator, after being created, may be cloned directly by VMware, thereby obtaining multiple Android simulators. Referring to FIG. 2, in an embodiment of the disclosure, there are totally 20 Android simulators, i.e., 19 Android simulator cloned by VMware plus an original. The 20 Android simulators run independently without mutual interferences. Different video software may run on the 20 Android simulators respectively.

In practical applications, the electronic device may write a Python script by using an automatic test framework Appium, thereby controlling all Android simulators. Running different video applications on multiple Android simulators may improve the efficiency of video acquisition. It is to be understood that when the electronic device sends a video access request, the electronic device sends, according to a video application running on the simulator, the video access request to a server corresponding to the video application.

Figure 3:
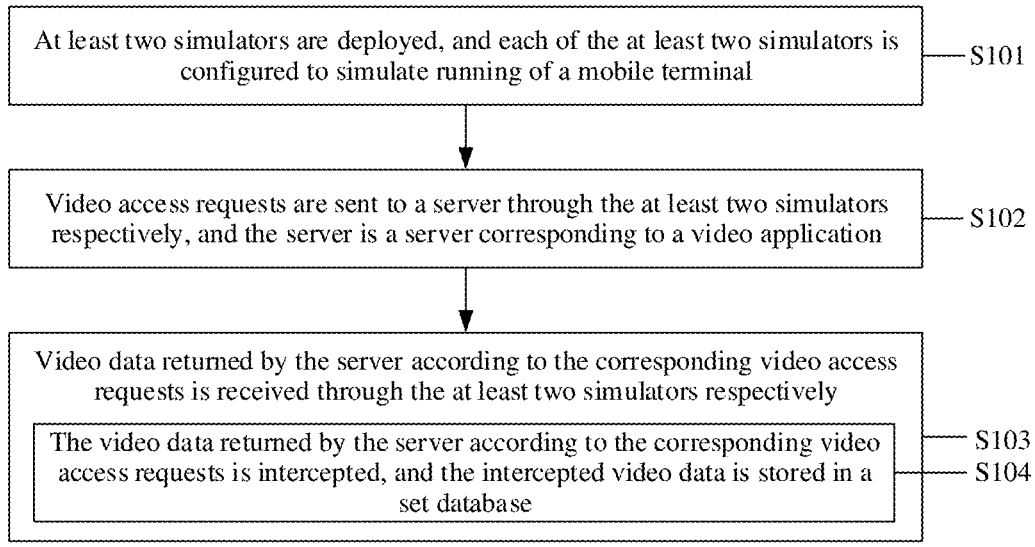
FIG. 3 is an implementation flowchart of a video data acquisition method according to an embodiment of the disclosure.

Referring to FIG. 3, FIG. 3 is an implementation flowchart of a video data acquisition method according to an embodiment of the disclosure. The method is performed by the electronic device shown in FIG. 1. The video data acquisition method includes the following operations.

In S101, at least two simulators are deployed, and each of the at least two simulators is configured to simulate running of a mobile terminal.

After a simulator is deployed, a parameter(s) corresponding to the simulator may be modified according to a set interval, or the parameter(s) corresponding to the simulator may be modified irregularly. For example, the parameter corresponding to the simulator is modified every time when the simulator is started, thereby making the parameter of the simulator different after each start. Alternatively, a user of the electronic device may trigger a signal of modifying the parameter of the simulator through an input panel arranged on a surface of the electronic device. The input panel may be a mechanical keypad, a touch display screen, or the like. The parameter includes at least one of a sequence number of the mobile terminal, a model number of the mobile terminal, or a Media Access Control (MAC) address. Modifying the parameter of the simulator may avoid the simulator being recognized by a server, thereby avoiding influences on the acquisition of video data.

In practical applications, the electronic device may modify the parameter of the simulator based on an xposed framework (system modification framework service). The simulator is rooted first, and then the parameter of the simulator is modified based on a Hook technology of the xposed framework. The xposed framework is a set of open-source framework service running in an Android high-authority mode as well as framework service capable of modifying the system without modifying an Android Application Package (APK) file. The Hook technology, also referred to as a hook function, may drag out a system program to modify a code segment.

In S102, video access requests are sent to a server through the at least two simulators respectively, and the server is a server corresponding to a video application.

In practical applications, the electronic device starts an Android Debug Bridge (ADB)-server in the local service. The ADB-server is a service process always running in background and is the only interface for interaction with the simulator. A simulator started by VMware is connected by adb shell, and adb shell is a script command for connection of a computer with an Android mobile terminal. After all the simulators are connected by adb shell respectively, the electronic device initiates an Appium process for each simulator. The Appium process may control the video application through an operation script to simulate a manual click operation. For example, a video search window of the video application is clicked through the operation script, a keyword is input, and then a search button of the video application is clicked, thereby sending a video data request to the server of the video application.

In the embodiment of the disclosure, for different video applications, the electronic device needs to execute different operation scripts to send video access requests to servers corresponding to the video applications. Specifically, in practical applications, the electronic device acquires an operation script corresponding to one of the video applications first, and then executes the operation script to send the video access request to the server corresponding to the video application.

Figure 4:
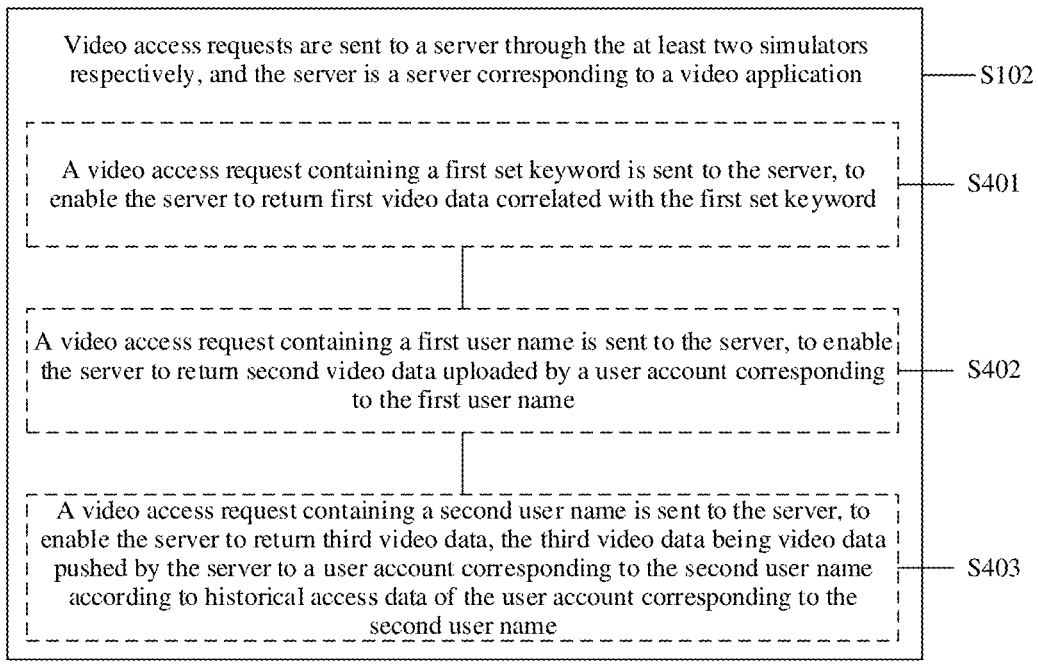
FIG. 4 is an implementation flowchart of another video data acquisition method according to an embodiment of the disclosure.

In an embodiment, as shown in FIG. 4, when the video access requests are sent to the server through the at least two simulators respectively, the method includes the following operations.

It is to be understood that several sending strategies for the video access requests are described in the embodiment of the disclosure. The magnitude of the sequence number of each operation in the embodiment does not represent the execution sequence.

In S401, a video access request containing a first set keyword is sent to the server, to enable the server to return first video data correlated with the first set keyword.

The server, after receiving a video data request containing the first set keyword, may return video data correlated with the first set keyword to the corresponding simulator. For example, if the first set keyword is basketball, the server may return video data correlated with basketball to the simulator. The video data correlated with basketball may be video data with a title containing basketball, or video data with a label of basketball, or video data with one or more comments including basketball.

In practical applications, an amount of video data needed to be acquired for each first set keyword may be set. For example, if there are totally ten first set keywords, ten pieces of video data are needed to be acquired for each first set keyword. If ten pieces of video data have been acquired for a certain first set keyword, the first set keyword is replaced, and video data corresponding to the next first set keyword is acquired. Here, the ten first set keywords may be sequenced for acquisition, and video data corresponding to the first set keywords is acquired according to the sequence.

In S402, a video access request containing a first user name is sent to the server, to enable the server to return second video data uploaded by a user account corresponding to the first user name.

The electronic device may also send a video access request containing a first user name to the server through an operation script, to enable the server to return second video data uploaded by a user account corresponding to the first user name That is, the second video data is uploaded to the server by the user account corresponding to the first user name. In practical applications, some users as video publishers may publish a series of video data, and the server, if receiving a video access request containing a user name of the video publisher, may correspondingly return all the video data published by the video publisher.

Figure 5:
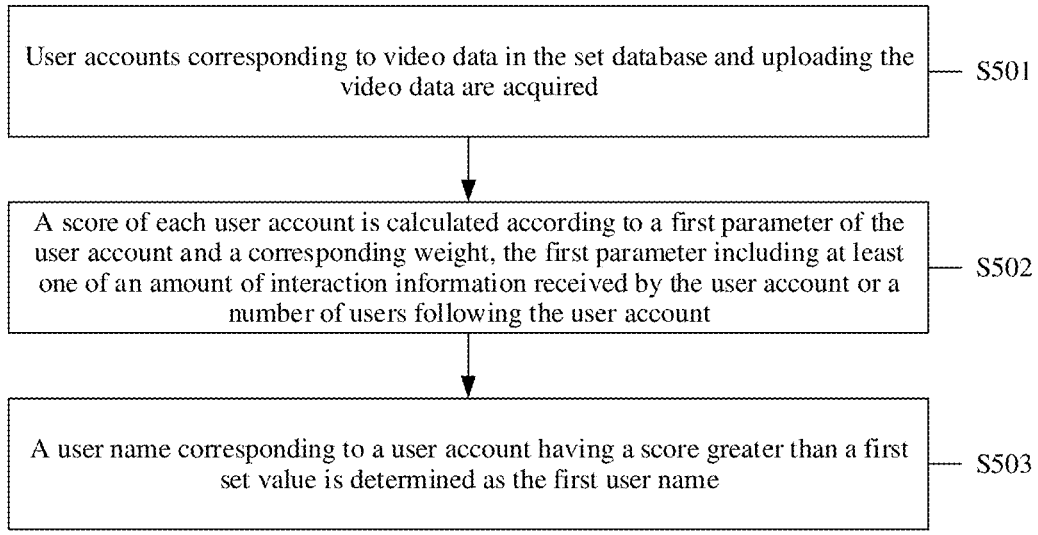
FIG. 5 is an implementation flowchart of another video data acquisition method according to an embodiment of the disclosure.

In some embodiments, as shown in FIG. 5, before the operation that the video access request containing the first user name is sent to the server, the acquisition method further includes the following operations.

In S501, user accounts corresponding to video data in the set database and uploading the video data are acquired.

Uploading user accounts corresponding to the video data in the set database are acquired.

In S502, a score of each user account is calculated according to a first parameter of the user account and a corresponding weight, and the first parameter includes at least one of an amount of interaction information received by the user account or a number of users following the user account.

The first parameter of the user account includes an amount of interaction information received by the user account and a number of users following the user account, i.e., a like count, follower count, and comment count commonly used on a software application. Here, the like count and the comment count correspond to the amount of the interaction information received by the user account, and the follower count corresponds to the number of users following the user account. If a follower count of a certain user account is 30, a number of users following the user account is 30. If a like count and comment count of a certain user account are 20 and 30 respectively, an amount of interaction information received by the user account is 20+30=50. In practical applications, a weight may be set for each of the amount of the interaction information received by the user account and the number of users following the user account, and a score of each user account is calculated. If the score is higher, it indicates that the influence or activeness of the user in the video application is greater. For example, weights of the amount of the interaction information received by the user account and the number of users following the user account are set to 60% and 40% respectively, and if an amount of interaction information received by a certain user account and a number of users following the user account are 10 and 20 respectively, a score of the user account is 60%×10+ 40%×20=14.

In S503, a user name corresponding to a user account having a score greater than a first set value is determined as the first user name.

A score of each user account is calculated, and the user account whose score is greater than a first set value is determined. If the score is greater than the first set value, it indicates that the influence or activeness of the user account in the video application is greater, and acquisition of video data uploaded by these user account may ensure that the acquired video data has a higher reference. In practical applications, the first set value may be set according to an overall score level. For example, if an average score of all user accounts is 100, the first set value may be set to 100 or a numerical value slightly greater than 100.

Finally, a user name corresponding to the user account having the score greater than the first set value is determined as the first user name. In practical applications, a data sheet may be created in the database, named first user name data sheet, and the user names corresponding to the user accounts whose scores are greater than the first set value are stored in the first user name data sheet according to a sequence of the scores.

Figure 6:
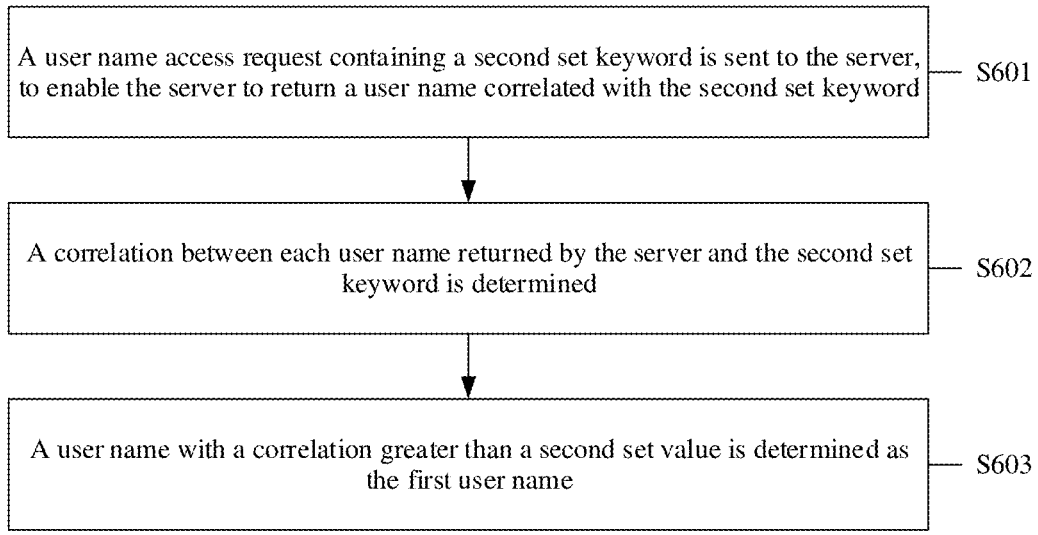
FIG. 6 is an implementation flowchart of another video data acquisition method according to an embodiment of the disclosure.

Besides the above method for determining the first user name, the first user name may also be determined on the video software according to a keyword search result. Referring to FIG. 6, FIG. 6 is an implementation flowchart of another video data acquisition method according to an embodiment of the disclosure. As shown in FIG. 6, the acquisition method further includes the following operations.

In S601, a user name access request containing a second set keyword is sent to the server, to enable the server to return a user name correlated with the second set keyword.

In practical applications, the video application has a video search window and a user search window. When a keyword is input to the corresponding window, the server may return content correlated with the keyword. When the keyword is input into the video search window, the server returns video data. When the keyword is input into the user search window, the server returns a user name.

In S602, a correlation between the user name returned by the server and the second set keyword is determined.

User names returned by the server may generally be ranked from high to low correlations with the keyword, and the correlation between the user name ranked closer to the top and the keyword is higher. For example, assuming that the second set keyword is basketball, if a certain user account uploads more video data whose titles contain basketball, it indicates that a correlation between a user name of the user account and basketball is higher, and the user name of the user account is ranked closer to the top.

In S603, a user name with a correlation greater than a second set value is determined as the first user name.

For example, user names corresponding to top ten correlations are determined as first user names. In practical applications, correlations corresponding to all user accounts are determined first, the user names are ranked according to the correlations and the correlation corresponding to the user name ranked the 11th is determined as the second set value. In such case, determining the user name(s) with correlation greater than the second set value as the first user name(s) refers to determining the top ten user names as first user names.

A correlation between a user name ranked closer to the top and the keyword is higher, and it indicates that, when a user browses videos by keyword searching, videos of the user account are browsed more. Therefore, targeted acquisition of video data of a user account ranked closer to the top may ensure that the acquired video data has a higher reference.

In S403, a video access request containing a second user name is sent to the server, to enable the server to return third video data, and the third video data is video data pushed by the server to a user account corresponding to the second user name according to historical access data of the user account corresponding to the second user name.

In practical applications, after a user starts video software, the video software may automatically push video data. This is because the user account, after logging on to the video software, may send a video access request containing the second user name to the server. The server may push video data similar to the historical access data to the video software according to the historical access data of the user account. For example, if most of the historical access data of the user account is correlated with basketball, video data correlated with basketball is pushed. The server preferentially pushes video data that is yet not browsed by the user account.

In S103, video data returned by the server according to the corresponding video access requests is received through the at least two simulators respectively.

Video data returned by the server is received through the simulator. For example, if a video access request is sent to the server A through the simulator A, the server A returns video data to the simulator A.

When the video data returned by the server according to the corresponding video access requests through the at least two simulators respectively, the acquisition method may further include the following operation.

In S104, the video data returned by the server according to the corresponding video access requests is intercepted, and the intercepted video data is stored in a set database.

The electronic device may intercept, through a packet capturing tool, the video data returned by the server according to the corresponding video access requests. For example, in practical applications, a man-in-the-middle proxy (mitmproxy) may be used to intercept the video data. The mitmproxy, as a Hyper Text Transfer Protocol (HTTP) proxy, may be used for man-in-the-middle attacks and data capturing. In the embodiment of the disclosure, the mitmproxy is mainly used as a proxy to capture the video data returned by the server. A specific implementation flow is as follows: an operation script is written based on mitmproxy with the Python language, and then the operation script is enabled with a script command mitmdump to intercept and parse the video data returned in response to the request of the simulator. An Internet Protocol (IP) proxy switching mechanism may further be added to the operation script, thereby ensuring the stable running of the packet capturing tool and protecting an IP address of the electronic device from being revealed.

The electronic device, after intercepting the video data, stores the video data in the set database. In practical applications, multiple databases may be set. One video application corresponds to one database, and video data acquired from a server corresponding to the video application is stored in the database. Multiple data sheets may also be set in the database according to video types and user names, and video data is stored in the corresponding data sheets according to user names and video types.

According to the embodiments of the disclosure, at least two simulators are deployed, and video access requests are sent to a server of a video application through the at least two simulators respectively, so that more video data may be acquired by concurrent processing of multiple simulators, and the video data acquisition efficiency is improved. In addition, when video data returned by the server according to the corresponding video access requests is received through the at least two simulators respectively, the video data returned by the server according to the corresponding video access requests is intercepted, so that the video application may be prevented from being shelled off and decrypted, and the problem in the related art that it is difficult to acquire video data during network supervision is solved. Moreover, searching for a video based on a keyword may ensure pertinence and reference of the acquired video data. Latest video data uploaded by a user account may be acquired by user name searching, thereby ensuring that the acquired video data is real-time.

Figure 7:
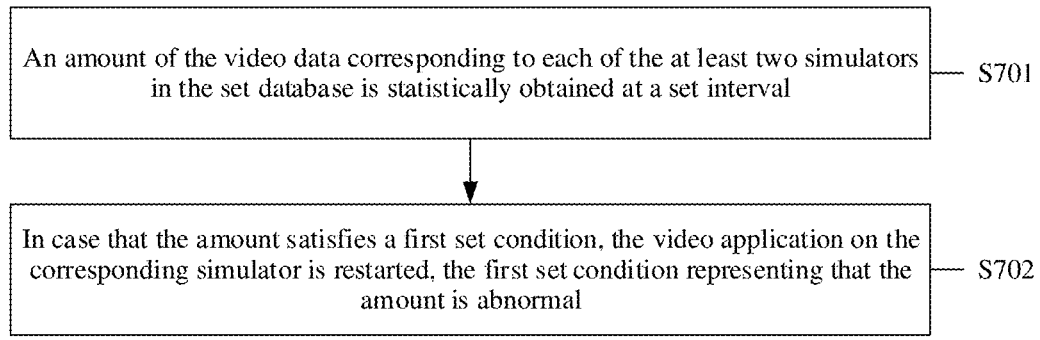
FIG. 7 is an implementation flowchart of another video data acquisition method according to an embodiment of the disclosure.

In an embodiment, as shown in FIG. 7, the acquisition method further includes the following operations.

In S701, an amount of the video data corresponding to each of the at least two simulators in the set database is statistically obtained at a set interval.

For example, the amount of the video data corresponding to each simulator in the set database is statistically obtained every ten minutes. It is to be understood that the electronic device, when storing video data, may make remarks in the database on the specific simulator to which the video data corresponds. For example, in practical applications, multiple data sheets may be set in the database, each data sheet corresponds to a simulator, video data is stored in the corresponding data sheets, and the amount of the video data in each data sheet is statistically obtained every ten minutes.

In S702, in case that the amount satisfies a first set condition, the video application on the corresponding simulator is restarted, and the first set condition represents that the amount is abnormal.

Since the electronic device may keep intercepting video data with the packet capturing tool and store the video data in the set database, in normal cases, the amount of the video data in the set database may keep increasing. If the amount of the video data in the set database increases at a lower speed or stops increasing, it indicates that a failure occurs to the video application. In such case, the video application may be restarted to enable the electronic device to acquire the video data on the video application again without affecting the video data acquisition efficiency.

The first set condition represents that the amount is abnormal. For example, if an amount of video data corresponding to a certain simulator in the set database increases by 10 every 10 minutes in normal cases, and the amount of the current video data corresponding to the simulator in the set database is 40, the amount of the video data corresponding to the simulator in the set database after 10 minutes is 50 in normal cases. If the amount of the video data corresponding to the simulator in the set database after 10 minutes is 43, less than 50, the amount satisfies the first set condition.

Figure 8:
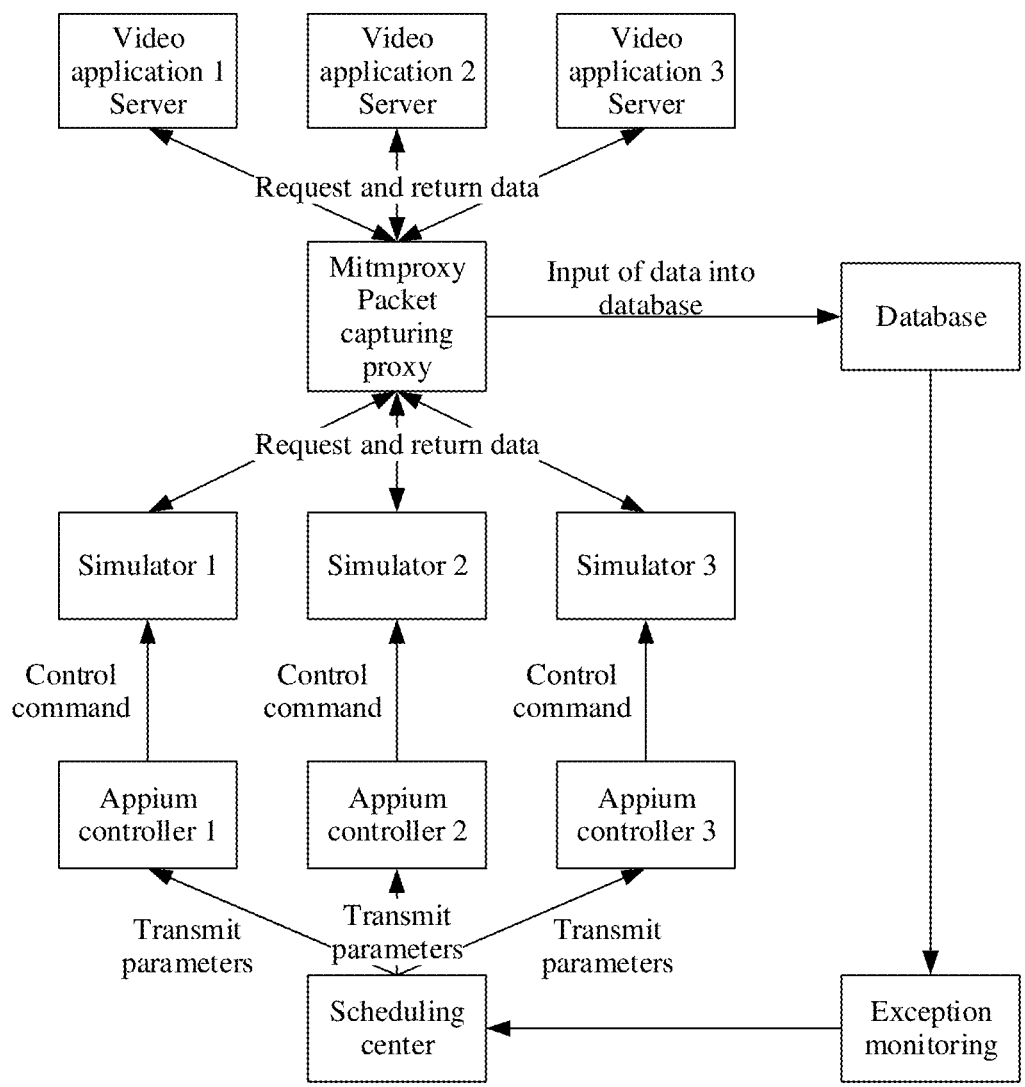
FIG. 8 is a schematic diagram of a system architecture of an electronic device according to an application embodiment of the disclosure.

FIG. 8 is a schematic diagram of a system architecture of an electronic device according to an application embodiment of the disclosure. In the embodiment of the disclosure, the electronic device may specifically be a server or server cluster, and as a scheduling center in the whole video acquisition framework, is configured to schedule multiple simulators running therein. Specific scheduling contents are as follows.

The scheduling center transmits one or more parameters to an Appium controller first. The Appium controller is an operation script written by an automatic test frame Appium, and may control an operation of the simulator. The Appium controller controls the simulator through a control command to send a video access request to a server of a video application. The scheduling center controls different simulators by use of different Appium controllers. For example, as shown in FIG. 8, Appium controller 1, Appium controller 2, and Appium controller 3 are used to control simulator 1, simulator 2, and simulator 3 respectively. According to a video application running on the simulator, a video access request is sent to a server corresponding to the video application. For example, if video software 1 runs on simulator 1, a video access request is sent to a server of video software 1. The server of the video application, after receiving the video access request, returns video data to the corresponding simulator according to a specific content of the video access request. In a returning process of the video data, the scheduling center intercepts, through a packet capturing proxy mitmproxy, the video data returned by the server, and stores the video data in a database. The mitmproxy does not influence the server to send the video data to the simulator. It can be understood that the mitmproxy generates a duplicate of the returned video data.

Besides sending a video request, the scheduling center may modify one or more parameters of the simulator through the Appium controller, thereby avoiding the simulator being recognized by the server. The scheduling center may further keep performing exception monitoring on the database, specifically statistically obtaining an amount of video data corresponding to each simulator in the database at a set interval. When the amount is abnormal, the video application on the corresponding simulator is restarted, thereby ensuring normal acquisition of video data. Details about a specific implementation process of the embodiment refer to the method embodiments, which are not elaborated herein.

Figure 9:
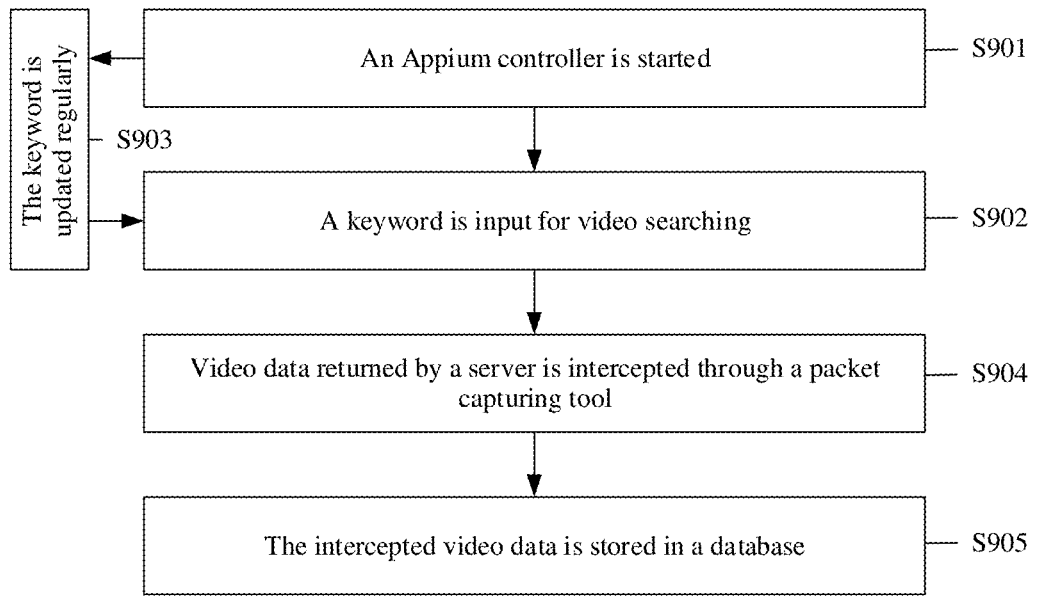
FIG. 9 is a flowchart of acquiring video data according to an application embodiment of the disclosure.

Based on the system architecture of FIG. 8, FIG. 9 shows a flowchart of acquiring video data according to an application embodiment of the disclosure.

In S901, an Appium controller is started.

The Appium controller is an operation script written by an automatic test frame Appium. An operation of a simulator may be controlled by the Appium controller.

In S902, a keyword is input for video searching.

The simulator is controlled by the Appium controller to operate and input a keyword into a search window of a video application to send a video access request to a server, such that the server returns first video data correlated with the keyword.

In S903, the keyword is updated regularly.

The keyword is updated at a set interval. Alternatively, it is set that a set amount of video data is acquired for each keyword. For example, a new keyword is input to the search window of the video application every ten minutes, or a new keyword is input to the search window of the video application after ten video data are acquired for the present keyword.

In S904, video data returned by a server is intercepted through a packet capturing tool.

The video data returned by the server according to the video access request is received through the simulator.

When the video data returned by the server according to the video access request is received through the simulator, the video data returned by the server according to the corresponding video access request is intercepted through the packet capturing tool.

In S905, the intercepted video data is stored in a database.

Figure 10:
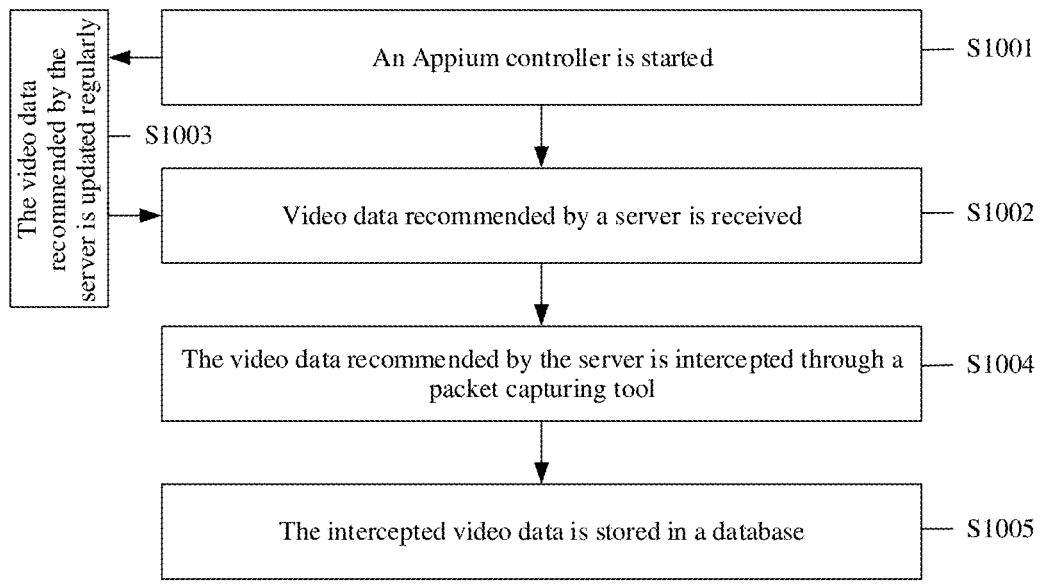
FIG. 10 is another flowchart of acquiring video data according to an application embodiment of the disclosure.

Based on the system architecture of FIG. 8, FIG. 10 shows another flowchart of acquiring video data according to an application embodiment of the disclosure.

In S1001, an Appium controller is started.

In S1002, video data recommended by a server is received.

After a video application on a simulator is started by the Appium controller, a user account logging on last time may usually log into the video application automatically. If no user logs into the video application on the simulator, user account information may be input through the Appium controller for logon. After the user account logs on, a video access request containing a second user name is sent to the server through the Appium controller, to enable the server to return third video data. The third video data is video data pushed by the server to the user account corresponding to the second user name according to historical access data of the user account corresponding to the second user name.

In S1003, the video data recommended by the server is updated regularly.

The server recommends a certain amount of video data to the user account every time, if the recommended video data is not updated, there is no video data for the user to continue to watch after watching the video data recommended by the server. Therefore, the recommended video data needs to be updated timely. In practical applications, a video updating request may be sent to the server at a set interval, and the server returns a certain amount of new video data to the simulator according to the video updating request.

In S1004, the video data recommended by the server is intercepted through a packet capturing tool.

In S1005, the intercepted video data is stored in a database.

Figure 11:
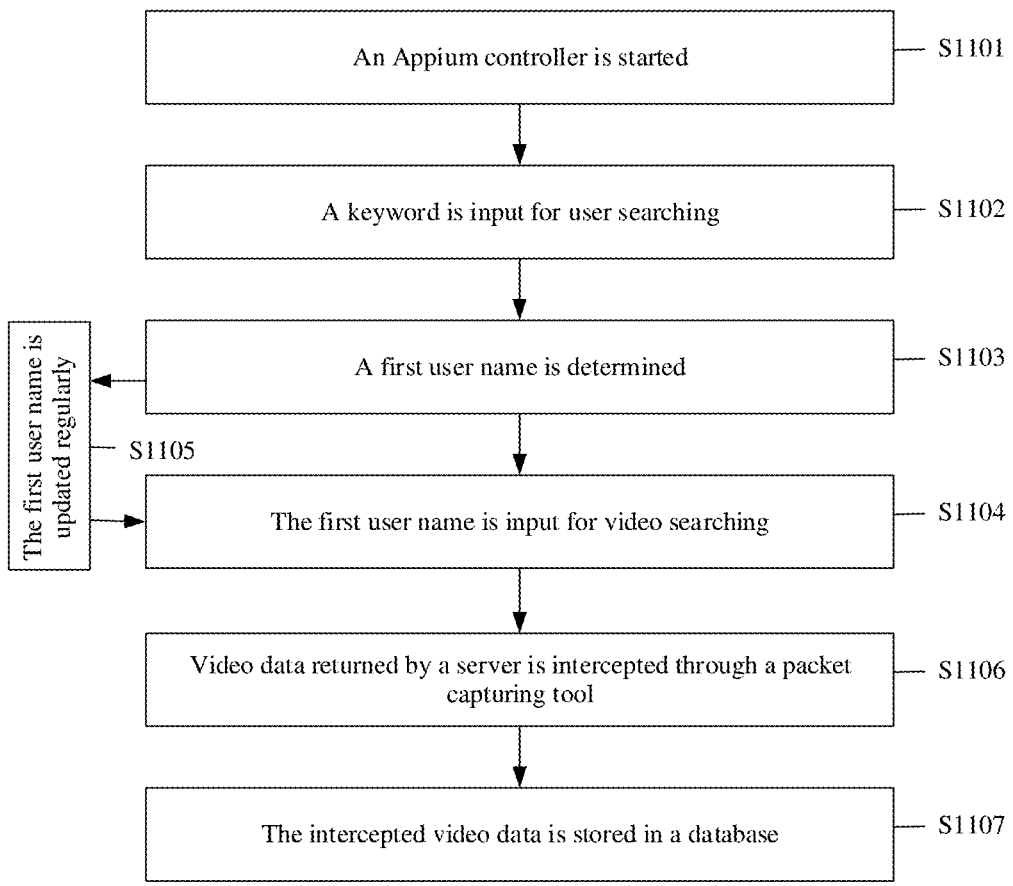
FIG. 11 is another flowchart of acquiring video data according to an application embodiment of the disclosure.

Based on the system architecture of FIG. 8, FIG. 11 shows another flowchart of acquiring video data according to an application embodiment of the disclosure.

In S1101, an Appium controller is started.

In S1102, a keyword is input for user searching.

A simulator is controlled by the Appium controller to operate and input a keyword into a search window of a video application to send a user name access request containing the keyword to a server, such that the server returns a user name correlated with the keyword.

In S1103, a first user name is determined.

Specifically, user accounts corresponding to video data in a set database and uploading the video data may be acquired. A score of each user account is calculated according to a first parameter of the user account and a corresponding weight. The first parameter includes at least one of an amount of interaction information received by the user account or a number of users following the user account. A user name corresponding to a user account whose score is greater than a first set value is determined as the first user name.

Alternatively, a user name access request containing a second set keyword is sent to the server, to enable the server to return user names correlated with the second set keyword. A correlation between each user name returned by the server and the second set keyword is determined. A user name whose correlation is greater than a second set value is determined as the first user name.

In S1104, the first user name is input for video searching.

The simulator is controlled by the Appium controller to operate and input the first user name to the search window of the video application to send a video access request containing the first user name to the server, such that the server returns video data correlated with the first user name.

In S1105, the first user name is updated regularly.

Each user account uploads limited video data, and if the video data uploaded by the user account is acquired all the time, video data acquisition is stopped after all the video data uploaded by the user account is acquired. Therefore, the first user name may be updated at a set interval, in order to prevent data acquisition from being stopped. In practical applications, the simulator is controlled by the Appium controller to operate and input a new first user name into the search window of the video application at the set interval to send a video access request containing the new first user name to the server. Alternatively, it is arranged that a set amount of video data is acquired for each first user name.

In S1106, video data returned by the server is intercepted through a packet capturing tool.

In S1107, the intercepted video data is stored in a database.

Figure 12:
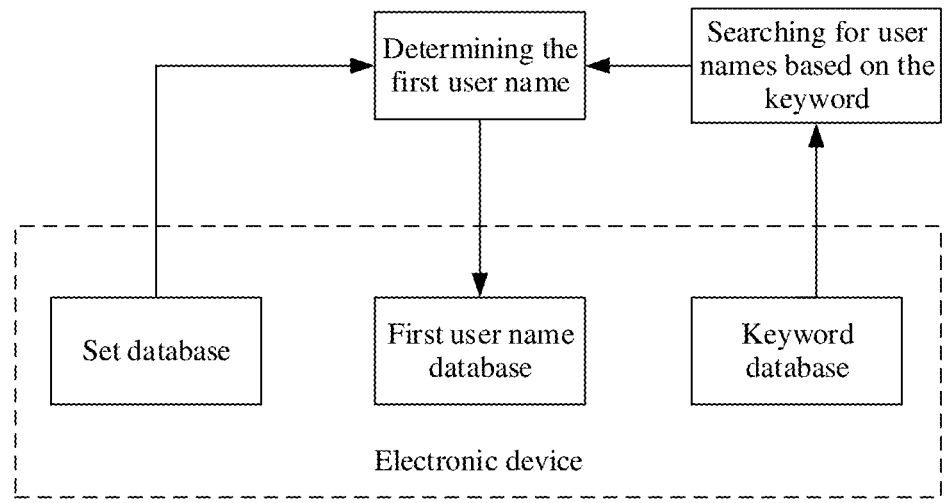
FIG. 12 is a flowchart of acquiring a first user name according to an application embodiment of the disclosure.

FIG. 12 shows a flowchart of acquiring a first user name according to an application embodiment of the disclosure.

There are two methods for acquiring the first user name in the application embodiment of the disclosure. According to the first method, a keyword is acquired from a keyword database first. The keyword database is stored in the electronic device, and stores keywords needed to be searched on the video software. After the keyword is acquired, the keyword is input to a user search window of the video software to search for user names correlated with the keyword. Then, a first user name whose correlation with the keyword is relatively high is determined from the searched user names. Finally, the first user name is stored in a first user name database of the electronic device. According to the second method, the first user name is determined from the set database. Specifically, user accounts corresponding to video data in the set database and uploading the video data are acquired first. Then, a score of each user account is calculated according to a first parameter of the user account and a corresponding weight. The first parameter includes at least one of an amount of interaction information received by the user account and a number of users following the user account. Finally, a user name corresponding to a user account having a score greater than a first set value is determined as the first user name, and the first user name is stored in the first user name database.

Details about a specific implementation process of operations not described in detail in the above embodiment refer to the method embodiments, and are not elaborated herein.

The embodiments of the disclosure provide three methods for acquiring video data on a video application. The first method is acquiring video data correlated with a keyword. The second method is acquiring video data recommended by a server. The third method is acquiring video data uploaded by a specified user. By multiple acquisition strategies in the embodiments of the disclosure, the acquired video data has a higher reference.

Figure 13:
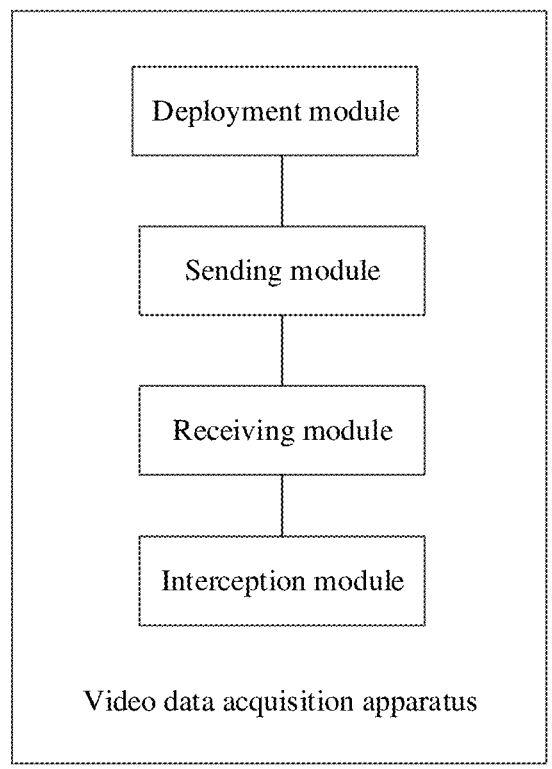
FIG. 13 is a structure diagram of a video data acquisition apparatus according to an embodiment of the disclosure.

Referring to FIG. 13, FIG. 13 is a schematic diagram of a video data acquisition apparatus according to an embodiment of the disclosure. The apparatus is arranged in an electronic device, and as shown in FIG. 13, includes a deployment module, a sending module, a receiving module, and an interception module.

The deployment module is configured to deploy at least two simulators. Each of the at least two simulators is configured to simulate running of a mobile terminal.

The sending module is configured to send, through the at least two simulators, video access requests to a server respectively. The server is a server corresponding to a video application.

The receiving module is configured to receive, through the at least two simulators, video data returned by the server according to the corresponding video access requests respectively.

The acquisition apparatus further includes an interception module.

The interception module is configured to intercept the video data returned by the server according to the corresponding video access requests, and store the intercepted video data in a set database.

The apparatus further includes a statistics module and a restarting module.

The statistics module is configured to statistically obtain an amount of the video data corresponding to each of the at least two simulators in the set database at a set interval.

The restarting module is configured to restart, in case that the amount satisfies a first set condition, the video application on the corresponding simulator. The first set condition represents that the amount is abnormal.

The apparatus further includes a modification module.

The modification module is configured to modify a parameter corresponding to the simulator.

The parameter may include at least one of a sequence number of the mobile terminal, a model number of the mobile terminal, or a Media Access Control (MAC) address.

The sending module is specifically configured to acquire an operation script corresponding to the video application, and execute the operation script to send the video access request to the server corresponding to the video application.

The sending module is specifically configured to: send a video access request containing a first set keyword to the server, to enable the server to return first video data correlated with the first set keyword; or send a video access request containing a first user name to the server, to enable the server to return second video data uploaded by a user account corresponding to the first user name; or send a video access request containing a second user name to the server, to enable the server to return third video data. The third video data is video data pushed by the server to a user account corresponding to the second user name according to historical access data of the user account corresponding to the second user name.

The apparatus further includes a first user name determination module.

The first user name determination module is configured to: acquire user accounts corresponding to video data in the set database and uploading the video data; calculate a score of each user account according to a first parameter of the user account and a corresponding weight, the first parameter including at least one of an amount of interaction information received by the user account or a number of users following the user account; and determine a user name corresponding to a user account having a score greater than a first set value as the first user name.

The first user name determination module is further configured to: send a user name access request containing a second set keyword to the server, to enable the server to return user names correlated with the second set keyword; determine a correlation between each of the user names returned by the server and the second set keyword; and determine a user name with a correlation greater than a second set value as the first user name.

It is to be noted that the video data acquisition apparatus provided in the embodiment is described with division of the above-mentioned modules as an example during video data acquisition, and in practical applications, the processing may be allocated to different modules for completion as needed, namely the internal structure of the apparatus is divided into different modules to complete all or part of above-mentioned processing. In addition, the video data acquisition apparatus provided in the embodiment belongs to the same concept of the video data acquisition method embodiments, and details about a specific implementation process thereof refer to the method embodiments, and will not be elaborated herein.

Figure 14:
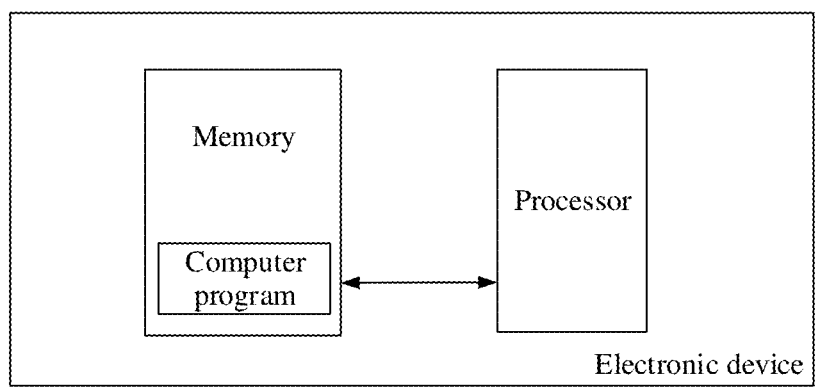
FIG. 14 is a hardware structure diagram of an electronic device according to an embodiment of the disclosure.

FIG. 14 is a schematic diagram of an electronic device according to an embodiment of the disclosure. As shown in FIG. 14, the electronic device of the embodiment includes a processor, a memory, and a computer program stored in the memory and capable of running in the processor. The processor executes the computer program to implement the operations in each method embodiment, such as the operations in S101 to S104 shown in FIG. 3. Alternatively, the processor executes the computer program to realize the function of each module/unit in each apparatus embodiment, such as the functions of the deployment module, sending module, receiving module, and interception module shown in FIG. 13.

Exemplarily, the computer program may be divided into one or more modules, and the one or more modules are stored in the memory and executed by the processor, to implement the disclosure. The one or more modules may be a series of computer program instruction segments capable of realizing specific functions. The instruction segment is used to describe an execution process of the computer program in the server.

The electronic device may include, but not limited to, a processor and a memory. It can be understood by those skilled in the art that FIG. 14 is only an example of the electronic device and not intended to limit the electronic device, more or fewer components than those shown in FIG. 14 may be included, or some components are combined, or different components are used. For example, the electronic device may further include an input/output device, a network access device, a bus and the like.

The processor may be a CPU, or may be another general-purpose processor, a Digital Signal Processor (DSP), an Application Specific Integrated Circuit (ASIC), a Field-Programmable Gate Array (FPGA) or another programmable logic device, discrete gate or transistor logic device, discrete hardware component, etc. The general-purpose processor may be a microprocessor. Alternatively, the processor may be any conventional processor, etc.

The memory may be an internal storage unit of the electronic device, such as a hard disk or internal memory of the electronic device. Alternatively, the memory may be an external storage device of the electronic device, such as a plug-in hard disk, Smart Media Card (SMC), Secure Digital (SD) card, and flash card in the electronic device. Further, the memory may also include both the internal storage unit and external storage device of the electronic device. The memory is configured to store the computer program and other programs and data needed by the electronic device. The memory may further be configured to temporarily store data that has been output or is about to be output.

Those skilled in the art may clearly know that, for convenient and brief description, the division of each of the above-mentioned function units and modules is only described as an example, and in practical applications, the functions may be allocated to different function units and modules for completion as needed, namely the internal structure of the apparatus is divided into different function units or modules, thereby completing all or part of the functions as described above. Each function unit and module in the embodiments may be integrated into a processing unit, each unit may also physically exist independently, and two or more than two units may also be integrated into a unit. The integrated unit may be implemented in a hardware form, or in form of a software function unit. In addition, the specific names of each function unit and module are only to distinguish and not intended to limit the scope of protection of the application. The specific working processes of the units and modules in the system may refer to the corresponding processes in the above-mentioned method embodiments, and will not be elaborated herein.

Each of the above-mentioned embodiments is described with different emphases, and undetailed or unrecorded parts in a certain embodiment may refer to the related descriptions in the other embodiments.

Those of ordinary skill in the art may realize that the units and algorithm steps of each example described in combination with the embodiments disclosed in the disclosure may be implemented by electronic hardware or a combination of computer software and electronic hardware. Whether these functions are executed by hardware or software depends on specific applications and design constraints of the technical solutions. Professionals may realize the described functions for each specific application by use of different methods, but such realization shall fall within the scope of the disclosure.

In the embodiments provided in the disclosure, it is to be understood that the disclosed apparatus/electronic device and method may be implemented in other manners. For example, the apparatus/electronic device embodiment described above is only schematic. For example, division of the modules or units is only logic function division, and other division manners may be used during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the apparatus or the units, and may be electrical and mechanical or adopt other forms.

The units described as separate parts may or may not be physically separated. Parts displayed as units may or may not be physical units, namely they may be located in the same place, or may be distributed to multiple network units. Part or all of the units may be selected to achieve the objectives of the solutions of the embodiments as practically needed.

In addition, each function unit in each embodiment of the disclosure may be integrated into a processing unit, each unit may also physically exist independently, and two or more than two units may also be integrated into a unit. The integrated unit may be implemented in a hardware form, or in form of a software function unit.

When being implemented in form of a software function unit and sold or used as an independent product, the integrated module/unit may be stored in a computer-readable storage medium. Based on such an understanding, all or part of the flows in the method of the above-mentioned embodiments of the disclosure may also be implemented by a computer program by instructing related hardware. The computer program may be stored in a computer-readable storage medium. When the computer program is executed, the operations of each method embodiment may be implemented. The computer program includes a computer program code. The computer program code may be in a source code form, an object code form, an executable file, or some intermediate forms. The computer-readable medium may include any entity or apparatus capable of carrying the computer program code, a recording medium, a U disk, a mobile hard disk, a magnetic disk, an optical disk, a computer memory, a Read-Only Memory (ROM), a Random Access Memory (RAM), an electrical carrier signal, a telecommunication signal, a software distribution medium, etc. It is to be noted that the content in the computer-readable storage medium may be added and deleted appropriately as required by laws and patent practices in jurisdictions. For example, according to laws and patent practices in some jurisdictions, the computer-readable medium does not include the electrical carrier signal and the telecommunication signal.

It is to be understood that terms "include" and "contain" used in the specification and the appended claims indicate the existence of a described feature, whole, step, operation, element, and/or component, but the existence or addition of one or more other features, wholes, steps, operations, elements, components, and/or a set thereof is not excluded.

It is to be noted that the technical solutions recorded in the embodiments of the disclosure may be combined freely without conflicts.

In addition, in the embodiments of the disclosure, "first", "second", etc., are for distinguishing similar objects and not necessarily for describing a specific sequence or order.

The above embodiments are only for describing rather than limiting the technical solutions of the disclosure. Although the disclosure is described with reference to the embodiments in detail, it is to be understood by those of ordinary skill in the art that modifications may also be made to the technical solutions recorded in each embodiment or equivalent replacements may be made to part of technical features therein. These modifications or replacements do not make the essence of the corresponding technical solutions depart from the spirit and scope of the technical solution of each embodiment of the disclosure, and shall fall within the scope of protection of the disclosure.

The invention claimed is:

1. A video data acquisition method, comprising:
deploying at least two simulators, each of the at least two simulators being configured to simulate running of a mobile terminal;
sending, through the at least two simulators, video access requests to a server respectively, the server being a server corresponding to a video application, wherein the sending comprises:
sending a video access request containing a first user name to the server, to enable the server to return first video data uploaded by a user account corresponding to the first user name; and
receiving, through the at least two simulators, video data returned by the server according to the corresponding video access requests respectively, wherein
when the video data returned by the server according to the corresponding video access requests is received through the at least two simulators respectively, the acquisition method further comprises:
intercepting the video data returned by the server according to the corresponding video access requests, and storing the intercepted video data in a set database;
wherein the acquisition method further comprises:
sending a user name access request containing a set keyword to the server, to enable the server to return user names correlated with the set keyword;
determining a correlation between each user name returned by the server and the set keyword; and
determining a user name with a correlation greater than a second set value as the first user name.

2. The acquisition method of claim 1, further comprising:
statistically obtaining an amount of video data corresponding to each of the at least two simulators in the set database at a set interval; and
restarting, in case that the amount satisfies a first set condition, a video application on the corresponding simulator, wherein the first set condition represents that the amount is abnormal.

3. The acquisition method of claim 1, further comprising:
modifying a parameter corresponding to at least one of the at least two simulators, wherein the parameter comprises at least one of a sequence number of the mobile terminal, a model number of the mobile terminal, or a Media Access Control (MAC) address.

4. The acquisition method of claim 1, wherein when the video access requests are sent to the server through the at least two simulators respectively, the method comprises:
acquiring an operation script corresponding to the video application; and
executing the operation script to send a video access request to the server corresponding to the video application.

5. The acquisition method of claim 1, wherein when the video access requests are sent to the server through the at least two simulators respectively, the method further comprises:
sending a second video access request containing a first set keyword to the server, to enable the server to return second video data correlated with the first set keyword; or
sending a third video access request containing a second user name to the server, to enable the server to return third video data, the third video data being video data pushed by the server to a user account corresponding to the second user name according to historical access data of the user account corresponding to the second user name.

6. The acquisition method of claim 5, wherein before sending the video access request containing the first user name to the server, the acquisition method further comprises:
acquiring user accounts corresponding to video data in the set database and uploading the video data;
calculating a score of each user account according to a first parameter of the user account and a corresponding weight, the first parameter comprising at least one of an amount of interaction information received by the user account or a number of users following the user account; and
determining a user name corresponding to a user account having a score greater than a first set value as the first user name.

7. The acquisition method of claim 1, wherein when different video applications are run on the at least two simulators, the acquisition method further comprises:
sending, through the at least two simulators, video access requests to servers of respective video applications; and
receiving, through the at least two simulators, video data returned by each server according to a respective video access request.

8. An electronic device, comprising a memory, a processor, and a computer program stored in the memory and configured to run in the processor, wherein the processor executes the computer program to implement a video data acquisition method, comprising:
deploying at least two simulators, each of the at least two simulators being configured to simulate running of a mobile terminal;
sending, through the at least two simulators, video access requests to a server respectively, the server being a server corresponding to a video application, wherein the sending comprises:
sending a video access request containing a first user name to the server, to enable the server to return first video data uploaded by a user account corresponding to the first user name; and receiving, through the at least two simulators, video data returned by the server according to the corresponding video access requests respectively, wherein when the video data returned by the server according to the corresponding video access requests is received through the at least two simulators respectively, the acquisition method further comprises:

intercepting the video data returned by the server according to the corresponding video access requests, and storing the intercepted video data in a set database;

wherein the processor is configured to execute the computer program to further implement:

sending a user name access request containing a set keyword to the server, to enable the server to return user names correlated with the set keyword;

determining a correlation between each user name returned by the server and the set keyword; and determining a user name with a correlation greater than a second set value as the first user name.

9. The electronic device of claim 8, wherein the processor is further configured to:

statistically obtain an amount of video data corresponding to each of the at least two simulators in the set database at a set interval; and restart, in case that the amount satisfies a first set condition, a video application on the corresponding simulator, wherein the first set condition represents that the amount is abnormal.

10. The electronic device of claim 8, wherein the processor is further configured to:

modify a parameter corresponding to at least one of the at least two simulators, wherein the parameter comprises at least one of a sequence number of the mobile terminal, a model number of the mobile terminal, or a Media Access Control (MAC) address.

11. The electronic device of claim 8, wherein the processor is further configured to:

acquire an operation script corresponding to the video application; and execute the operation script to send a video access request to the server corresponding to the video application.

12. The electronic device of claim 8, wherein the processor is further configured to, through the at least two simulators, send a second video access request containing a first set keyword to the server, to enable the server to return second video data correlated with the first set keyword; or send a third video access request containing a second user name to the server, to enable the server to return third video data, the third video data being video data pushed by the server to a user account corresponding to the second user name according to historical access data of the user account corresponding to the second user name.

13. The electronic device of claim 12, wherein the processor is further configured to:

acquire user accounts corresponding to video data in the set database and uploading the video data;

calculate a score of each user account according to a first parameter of the user account and a corresponding weight, the first parameter comprising at least one of an amount of interaction information received by the user account or a number of users following the user account; and determine a user name corresponding to a user account having a score greater than a first set value as the first user name.

14. The electronic device of claim 8, wherein when different video applications are run on the at least two simulators, the processor is further configured to:

send, through the at least two simulators, video access requests to servers of respective video applications; and receive, through the at least two simulators, video data returned by each server according to a respective video access request.

15. A non-transitory computer-readable storage medium, having stored a computer program thereon, wherein the computer program comprises a program instruction that, when executed by a processor, enables the processor to execute a video data acquisition method, comprising:

deploying at least two simulators, each of the at least two simulators being configured to simulate running of a mobile terminal;

sending, through the at least two simulators, video access requests to a server respectively, the server being a server corresponding to a video application, wherein the sending comprises:

sending a video access request containing a first user name to the server, to enable the server to return first video data uploaded by a user account corresponding to the first user name; and receiving, through the at least two simulators, video data returned by the server according to the corresponding video access requests respectively, wherein when the video data returned by the server according to the corresponding video access requests is received through the at least two simulators respectively, the acquisition method further comprises:

intercepting the video data returned by the server according to the corresponding video access requests, and storing the intercepted video data in a set database;

wherein the acquisition method further comprises:

sending a user name access request containing a set keyword to the server, to enable the server to return user names correlated with the set keyword;

determining a correlation between each user name returned by the server and the set keyword; and determining a user name with a correlation greater than a second set value as the first user name.

* * * * *